(12) United States Patent
Huff et al.

(10) Patent No.: US 12,715,492 B2
(45) Date of Patent: Aug. 25, 2026

(54) PALLET AND HANDTRUCK

(71) Applicant: Sysco Corporation, Houston, TX (US)

(72) Inventors: David Huff, Batavia, OH (US); Dana Triplett, Advance, NC (US); Christopher Maughan, Dublin, OH (US); Jake Burkert, Garwood, NJ (US); Shawn Stoll, Elbert, CO (US); Gene G. O'Brien, Tonka Bay, MN (US); Luke Nahorniak, Lonsdale, MN (US)

(73) Assignee: Sysco Corporation, Houston, TX (US)

( * ) Notice: Subject to any disclaimer, the term of this patent is extended or adjusted under 35 U.S.C. 154(b) by 376 days.

(21) Appl. No.: 18/351,815

(22) Filed: Jul. 13, 2023

(65) Prior Publication Data

US 2024/0017756 A1 Jan. 18, 2024

Related U.S. Application Data

(60) Provisional application No. 63/368,595, filed on Jul. 15, 2022.

(51) Int. Cl.
*B62B 3/06* (2006.01)
*B62B 3/02* (2006.01)
*B62B 5/00* (2006.01)

(52) U.S. Cl.
CPC .............. *B62B 3/0612* (2013.01); *B62B 3/02* (2013.01); *B62B 5/0033* (2013.01); *B62B 2206/003* (2013.01)

(58) Field of Classification Search
CPC ...... B62B 2203/10; B62B 2203/70–74; B62B 2206/06; B62B 3/001; B62B 3/02; B62B 3/04; B62B 3/08; B62B 3/0612; B62B 5/0033; B62B 5/004; B62B 5/0053; B65D 2519/00781; B65D 2519/00786; B65D 2519/00805
See application file for complete search history.

(56) References Cited

U.S. PATENT DOCUMENTS

| | | | | |
|---|---|---|---|---|
| 2,468,055 A * | 4/1949 | Gibler | B66F 9/12 | 414/439 |
| 5,582,114 A * | 12/1996 | Feiner | B65D 19/0034 | 280/304.5 |
| 5,752,584 A * | 5/1998 | Magoto | B62B 3/06 | 187/233 |

OTHER PUBLICATIONS

AllConsult Ltd. DE 202005009537U1 (Year: 2006).*
AllConsult Ltd. DE202006014414U1 (Year: 2008).*

* cited by examiner

*Primary Examiner* — Tyrone V Hall, Jr.
(74) *Attorney, Agent, or Firm* — Perilla Knox & Hildebrandt LLP

(57) ABSTRACT

An improved material transport system comprising a pallet with an integrated conveyor belt and a powered handtruck operative to move and configure the pallet for loading, transport and unloading. A lift bar on the handtruck has a lower position, wherein the handtruck is used to transport the pallet on a ground surface, and an upper position wherein the rear end of the pallet is lifted to unload material from the conveyor belt to the ground surface. The weight of material on the conveyor belt may cause the material to be unloaded due to gravity, or the belt may be electrically powered. Alternatively, the pallet may include a drive wheel that contacts the ground surface. The drive wheel is mechanically coupled to the front roller of the conveyor belt, causing the belt to move and unload the material onto a ground surface when the handtruck and pallet are moved rearwardly.

18 Claims, 6 Drawing Sheets

226
209
211
220
207
214

PALLET AND HANDTRUCK

REFERENCE TO RELATED APPLICATIONS

This application claims priority to and the benefit of U.S. Provisional Patent Application Ser. No. 63/368,595, filed Jul. 15, 2022, the entire content of which is incorporated herein by reference.

FIELD OF THE INVENTION

The present invention relates to material handling and, more particularly, to an improved material transport system and method comprising a conveyor pallet and handtruck combination.

BACKGROUND OF THE INVENTION

Pallets are used in shipping to provide space beneath a load of goods on the pallet for a forklift, pallet jack, or similar lifting device to insert lifting extensions beneath the load without contacting the load itself. The pallet replaced older forms of crating such as wooden boxes and barrels. Pallets are of standardized dimensions and define the length and width of a unit load. This standardization provides efficiencies in lifting device design, use of storage space, warehouse design, door widths, etc.

Despite the many advantages provided by the widespread use of pallets, there areas that could be improved. For example, standard pallets do not have wheels associated with them. Thus, to move a pallet, a pallet transport device must lift the entire load off of the ground. This results in pallet truck designs that include long forks with wheels located inside the distal ends of the forks.

There is thus a need for a pallet that can be moved without the use of forks. There is a corresponding need for a forkless handtruck designed for use with the pallet. It would also be an advantage to provide a pallet that includes a mechanism that assists with the offload of goods.

SUMMARY OF THE INVENTION

This invention resides in an improved material transport system comprising a pallet with an integrated conveyor belt and a powered handtruck operative to move and configure the pallet for loading, transport and unloading.

The conveyor pallet has front and rear ends, and wherein the rear end of the pallet includes a mechanical coupling. The handtruck has a set of ground-contacting wheels and a front end with a lift bar adapted for removeable attachment to the mechanical coupling on the rear end of the pallet. The pallet includes at least a set of front wheels, and a conveyor belt disposed on front and rear rollers. The lift bar on the handtruck has a lower position, wherein the handtruck is used to transport the pallet on a ground surface, and an upper position wherein the rear end of the pallet is lifted to unload material from the conveyor belt to a ground surface.

Different embodiments are disclosed to facilitate the unloading process. In one embodiment, the weight of material on the conveyor belt causes the material to be unloaded due to gravity when the lift bar is in the upper position. In another embodiment, the pallet includes an electrical power source causing the conveyor belt to move through the activation of a user control.

In a preferred embodiment, the pallet includes a drive wheel that contacts the ground surface when the lift bar on the handtruck is in the upper position. The drive wheel is mechanically coupled to the front roller of the conveyor belt, causing the belt to move and unload the material onto a ground surface when the handtruck and pallet are moved rearwardly.

The lift bar on the handtruck may be a powered lift bar driven by a battery in the handtruck. The set of ground-contacting wheels of the handtruck may also be powered by the battery in the handtruck. The handtruck has a handle that may be equipped with one or more user controls, including a FORWARD/REVERSE throttle and/or a lift bar UP/DOWN user control.

In the preferred embodiment, the pallet only includes a set of front wheels and no rear wheels. In operation, the handtruck is simply attached to a rear edge of the pallet to lift the rear edge off the ground slightly for transport. This leaves a majority of the load supported by the front wheels of the pallet.

The handtruck is preferably a two-wheeled handtruck that is compact, lightweight, and easy to maneuver and store. At least one elongated handle, oriented to provide ergonomically-maximized leverage, extends upwardly from the handtruck housing. A further aspect of the invention provides a powered two-wheeled handtruck, in which case the housing holds a battery and a lifting mechanism that operates a lifting bar that is connectable to the rear edge of the pallet. The handle may include controls for lifting and moving.

DETAILED DESCRIPTION OF THE INVENTION

This invention resides in a system for loading, transporting, and unloading packaged goods and any other materials that may be palletized for delivery. In the preferred embodiments, the system comprises a pallet with an integral conveyor belt, and a handtruck that couples to the pallet to move the pallet and offload goods on the pallet.

Figure 1:
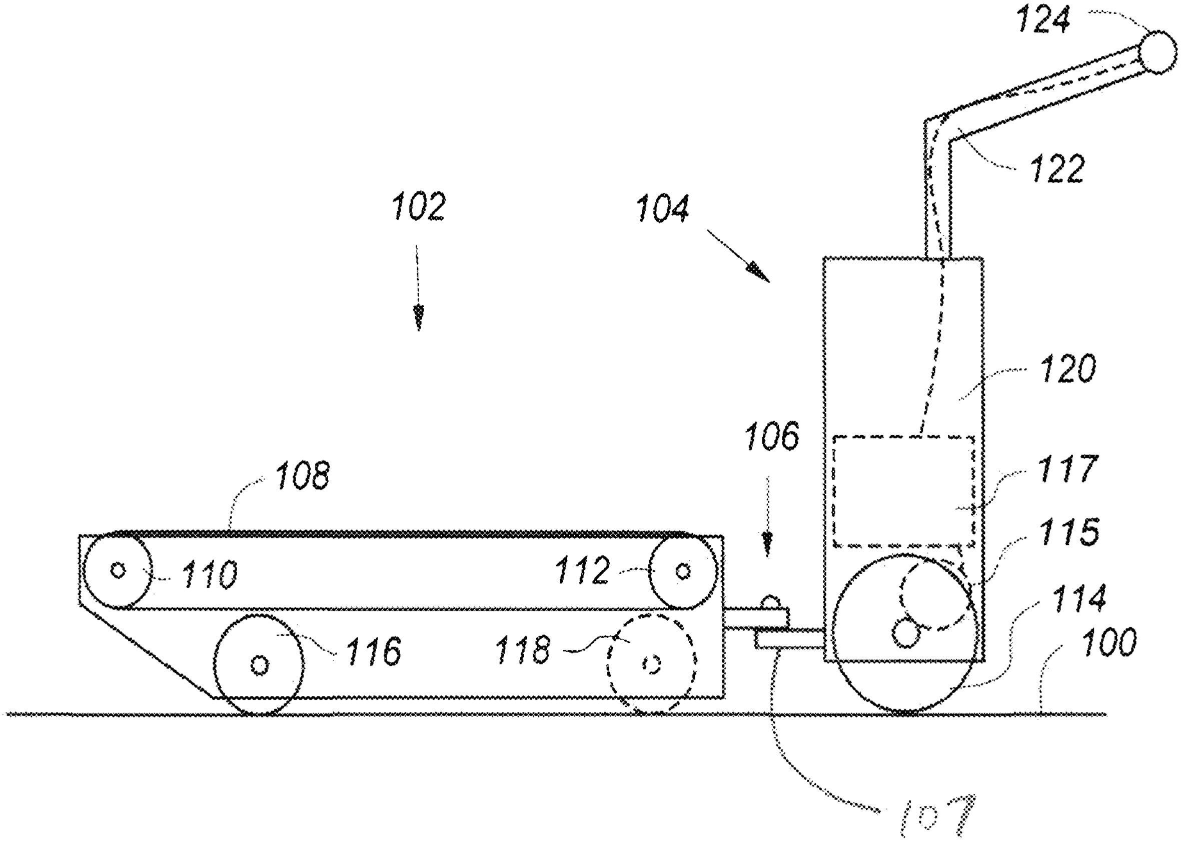
FIG. 1 is a is a schematic side view of a system used to introduce the inventive concepts.

FIG. 1 is a schematic side view of a system used to introduce the inventive concepts. The conveyor pallet is shown generally at 102, and the handtruck is depicted at 104. The conveyor pallet is removably coupled to the handtruck at connection 106 which, in the preferred embodiment, is a pivoting connection.

The pallet 102 includes a conveyor belt 108 disposed on front and rear rollers 110, 112 that serves as the loading platform for the pallet. The handtruck 104 preferably has a single set of right/left wheels 114. The pallet 102 may have front/rear wheels 116, 118 as shown or, as described below, only front wheels 116 are provided. The handtruck 104 includes a housing 120. A handle 122 extends upwardly from the housing to a grip area 124 which may include controls depending upon the embodiment.

The wheels 114 of the handtruck 104 are driven by an electric motor 115 powered by a rechargeable battery pack 117, both contained in housing 120. A power cord (not shown) would be used to recharge the batteries 117. In alternative embodiments, the wheels of one or both of the handtruck and pallet may be powered through separate, battery powered electric motors. The pallet may have its own battery or may make an electrical connection to the handtruck to use battery 117. In the preferred embodiment, however, only the wheels of the handtruck are powered.

The handtruck further includes an outwardly extending lift bar 107 used to make connection with the pallet through coupling 106. Also in the preferred embodiment, the lift bar 107 is driven by a motor, also powered by battery 117, causing the lift bar to move up and down for pallet unloading purposes as described below.

In use, goods and placed on the belt 108, and the handtruck 104 is used to maneuver the pallet 102 to an area designated for unloading. At this point different alternative techniques may be used to unload the goods. In accordance with a one embodiment, member 107 is powered upwardly, causing the rear end of the pallet to move up as well, such that the such that the weight of the goods cause the goods to slide off. The handtruck may be pulled backwardly to assist with the unloading. It has been found that at an angle in the range of 10 to 20 degrees, most goods will slide off and on to the floor or ground 100 (FIG. 1). Indeed, as opposed to a rotating belt, smooth metal or plastic surface may be used, possibly with friction-reducing coatings. While this is a simple solution, unloading may be unpredictable due to the size, weight and number of the packages or containers involved.

Figure 6:
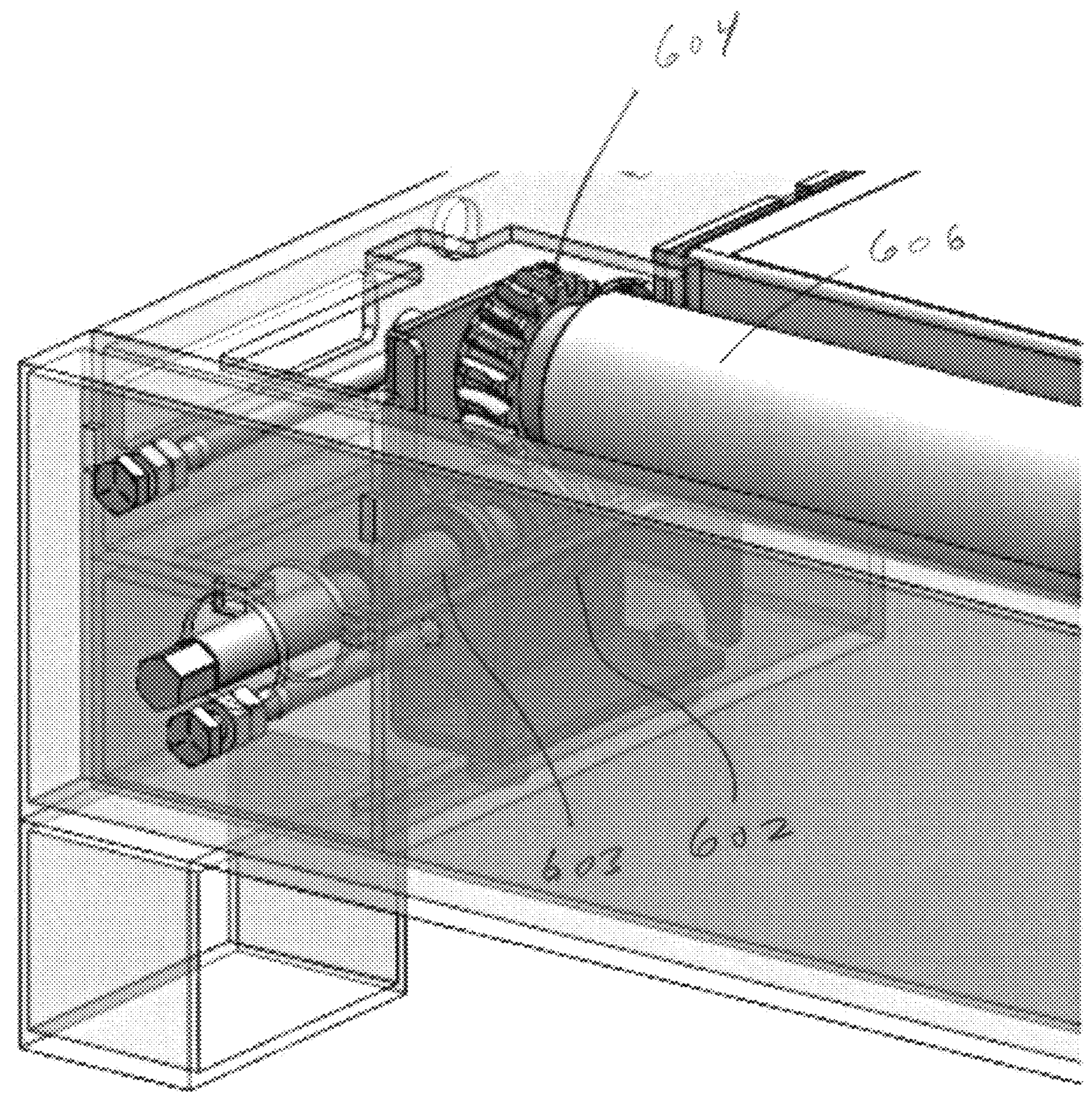
FIG. 6 illustrates the use of worm screw on a rotating shaft driving a worm gear coupled to conveyor belt roller.

Accordingly, in preferred embodiments, the conveyor belt is also powered. Any applicable technology may be used for this purpose, including electric, pneumatic, hydraulic or mechanical coupling to the handtruck. For example, FIG. 6 illustrates the use of worm screw 602 on rotating shaft 603 driving a worm gear 604 coupled to conveyor belt roller 606. Shaft 603 would be rotated by an electric motor disposed on the pallet, with wiring coupled to the handle of the handtruck for belt FORWARD, REVERSE and optional speed control. A chain or other drive mechanism may alternatively be used. In this arrangement, either or both rollers of the belt may be powered, and indeed the pallet need not be tilted depending upon the size/weight of the materials to be unloaded. While this solution provides more predictable control, if power to the belt drive is lost manual unloading would need to be used.

In a more preferred embodiment, the conveyor belt of the pallet is rotated through a set of ground-contacting wheels as described below. This leads to a simplified pallet construction facilitating cost-effective production of multiple pallets, relegating electric and control apparatus to the handtruck only.

Figures 2A, 2B:
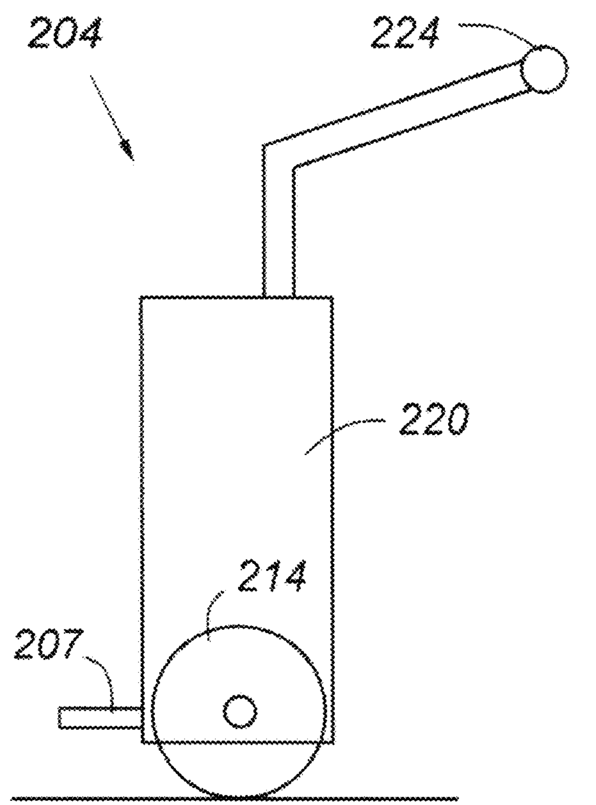
FIG. 2A is a schematic side view of a handtruck with a powered lifting bar.
FIG. 2B is a front view of the handtruck of FIG. 2A.

FIG. 2A is a side view of a preferred handtruck 204, and FIG. 2B is a front view of the handtruck 204. In this embodiment, the housing 220 includes a rechargeable battery and electric motor that drives wheels 214. Handle 224 includes a throttle control 226, preferably enabling the handtruck to move forward and reverse at different speeds. The forward lift bar 207 is battery powered for UP/DOWN movement through a separate lift control 209 on the handle. Any appropriate mechanism may be used for this purpose, including a motorized chain or threaded rod/jackscrew 211. The pallet 302 may further include forward/rear forklift pockets 304, 306, as well as holes 322 to receive a removeable forward load retaining barrier 324.

Figure 3A:
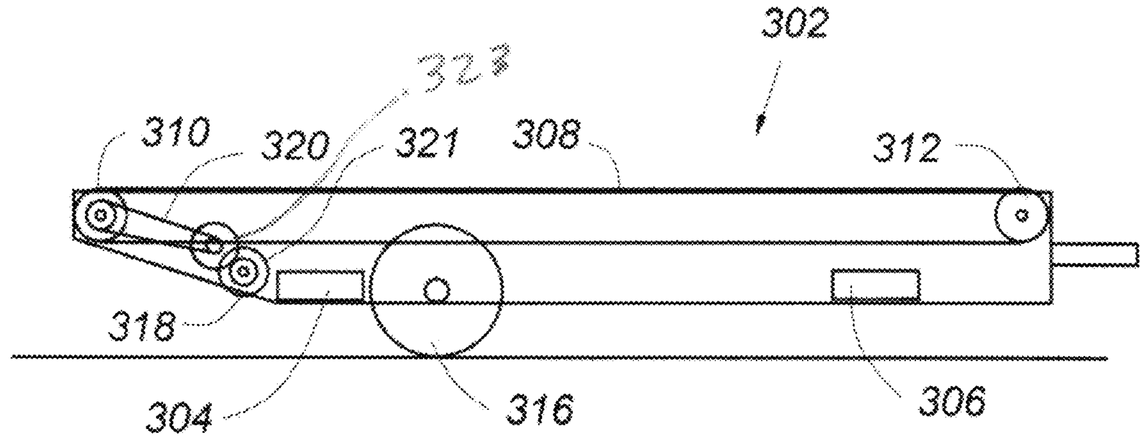
FIG. 3A is a schematic side view of a conveyor pallet with a ground-contacting drive wheel with a mechanical coupling operative to move the conveyor belt.
Figure 3B:
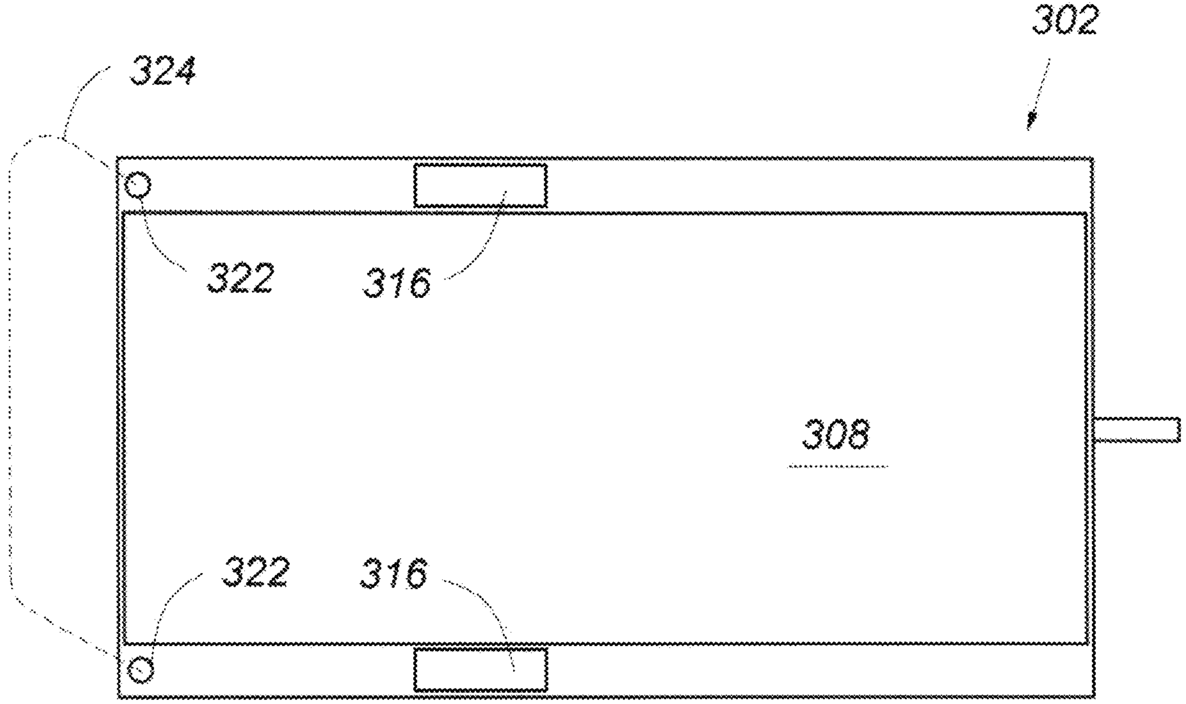
FIG. 3B is a top view of the conveyor pallet of FIG. 3A.

The UP/DOWN movement of the handtruck lift control will now be described with reference to FIG. 3, wherein FIG. 3A is a side view of a conveyor pallet and FIG. 3B is a top view thereof. In this embodiment, the conveyor pallet includes a single set of wheels 316 disposed near the forward end of the pallet 302. Conveyor belt 308 is journaled over forward/rear rollers 310, 312. However, at least forward roller 310 is coupled to a drive wheel 318 through an intermediate gear 323 and drive chain 320.

Figure 4:
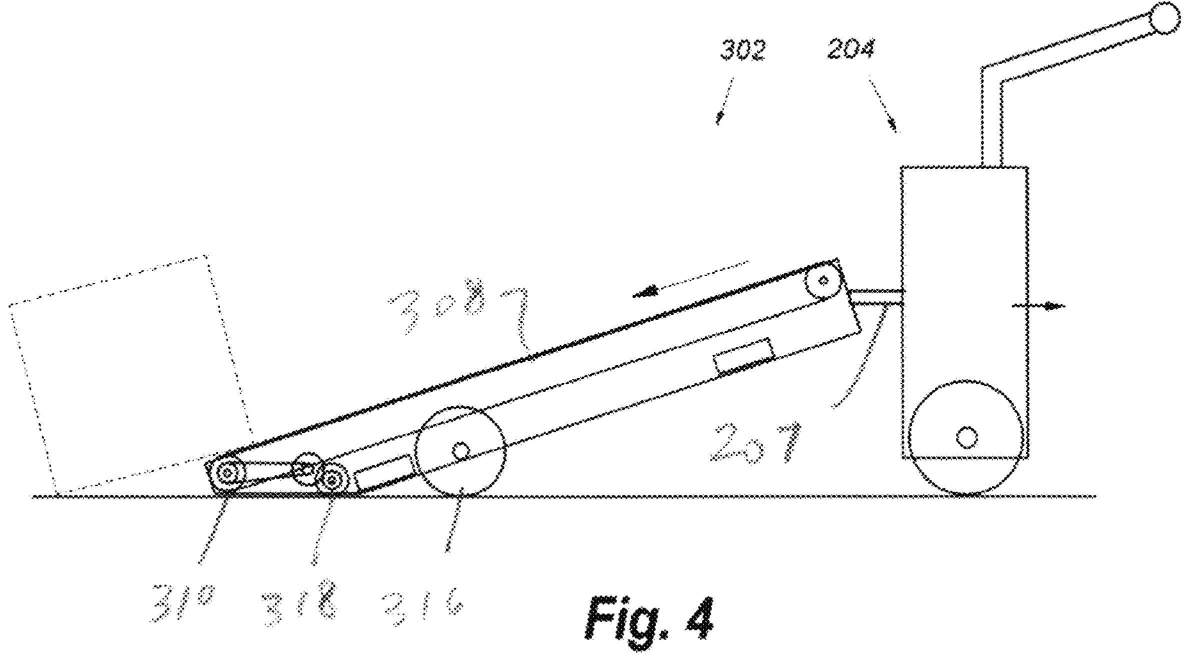
FIG. 4 is a schematic side view of a handtruck with a powered lifting bar lifting the rear end of a conveyor pallet so that goods are unloaded onto a ground surface.

When transporting a load, the rear end of the pallet is lifted by lift bar 207 just enough to allow the pallet to ride on the front wheels 316. Unloading of the pallet is accomplished by lifting the rear edge of the pallet (if not already elevated) so as to engage the drive wheel 318 so that it makes contact with the ground surface, as shown in FIG. 4. Once an appropriate lift height is achieved, the handtruck is pulled backwardly, causing the drive wheel 318 to move the conveyor belt in a forward direction, allowing the load to transfer to the ground, even without sliding of the goods against the belt. Note that it may be possible to pull back on the handtruck manually, especially with lighter loads.

Figure 5:
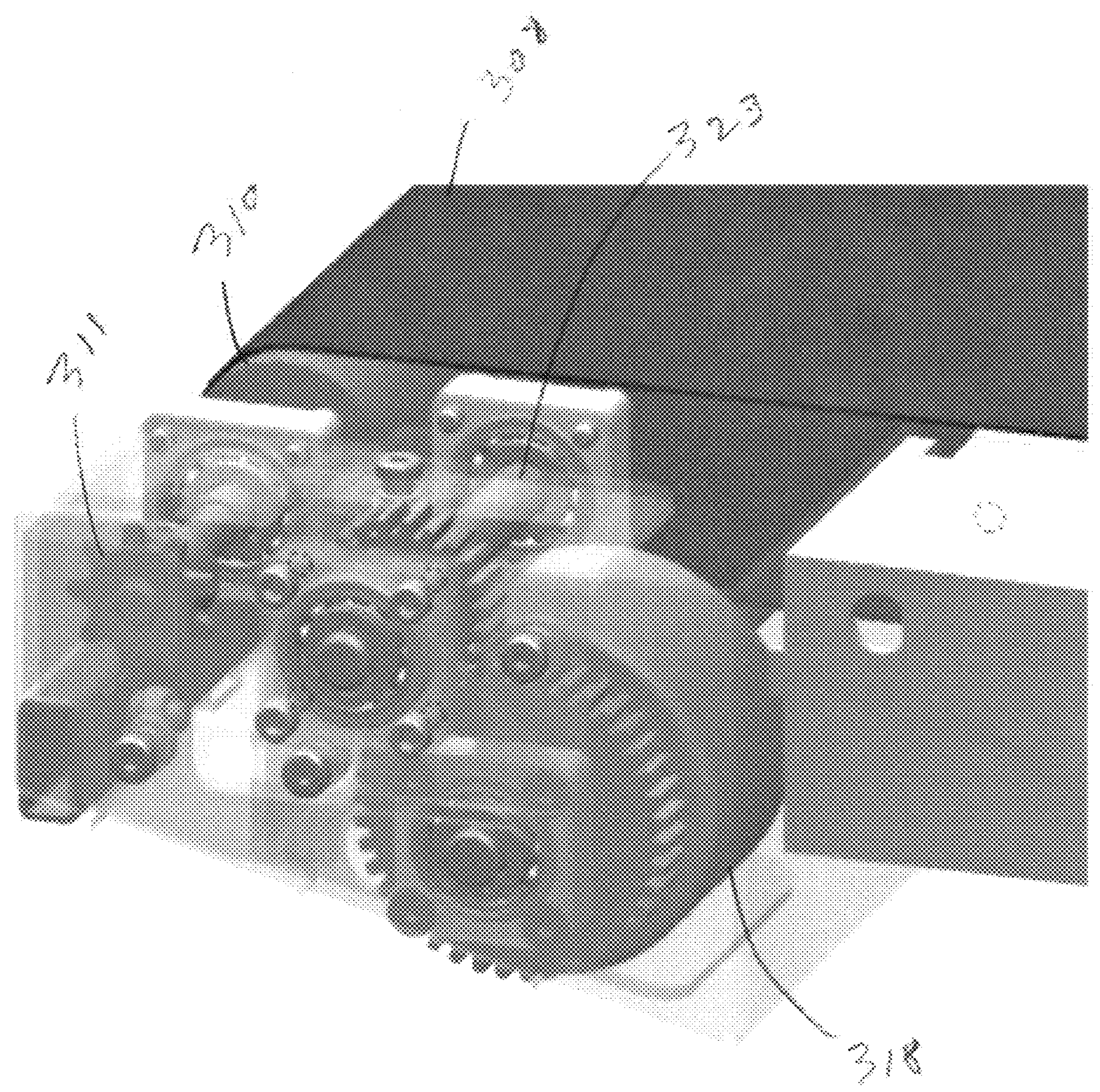
FIG. 5 is a detail drawing showing a drive wheel coupled to an intermediate wheel through meshing gears.

FIG. 5 is a detail drawing showing drive wheel 318 coupled to intermediate wheel 323 through meshing gears. Wheel 323 in turn is coupled to roller 310 by way of a chain (not shown) coupled to sprocket 311. As an option, the drive wheel 318 may be disposed on a slide block that moves upwardly within a slot to a position that avoids ground contact. A chain tensioner may also be provided to counteract chain stretching over time. Note further than while a chain on sprockets is used in the preferred embodiment, various different styles of pulleys may also be used. As a further alternative a gear train without chains or belts may be used. Also, a pair of drive wheels and associated belt drive units may be used on both side of the pallet.

The invention claimed is:

1. A material transport system, comprising:

a pallet having front and rear ends, and wherein the rear end of the pallet includes a mechanical coupling; and a handtruck with a set of ground-contacting wheels and a front end with a lift bar adapted for removeable attachment to the mechanical coupling on the rear end of the pallet;

wherein the pallet includes a set of front wheels and a conveyor belt disposed on front and rear rollers, wherein the lift bar on the handtruck has a lower position wherein the pallet is level and the handtruck is used to transport the pallet in a rolling motion on the front wheels on a ground surface, and an upper position wherein the rear end of the pallet is lifted to unload material from the conveyor belt to the ground surface, wherein the pallet includes a drive wheel that contacts the ground surface when the lift bar on the handtruck is in the upper position with the rear end of the pallet lifted but does not contact the ground surface when the lift bar on the handtruck is in the lower position, and wherein the drive wheel is coupled to the front roller of the conveyor belt so that the belt moves forward when the drive wheel moves rearward, causing the belt to move and unload the material onto the ground surface when the handtruck and pallet are moved rearwardly.

2. The material transport system of claim 1, wherein the weight of material on the conveyor belt causes the material to be unloaded due to gravity when the lift bar is in the upper position.

3. The material transport system of claim 1, wherein the pallet includes an electrical power source causing the conveyor belt to move through the activation of a user control.

4. The material transport system of claim 3, wherein the pallet includes an electrical motor that is powered by the electrical power source and that drives at least one of the front and rear rollers to move the conveyor belt to unload the material.

5. The material transport system of claim 1, wherein the lift bar on the handtruck is a powered lift bar driven by a battery in the handtruck.

6. The material transport system of claim 1, wherein the set of ground-contacting wheels of the handtruck are powered by a battery in the handtruck.

7. The material transport system of claim 1, wherein the handtruck has a handle with a user-controlled FORWARD/REVERSE throttle.

8. The material transport system of claim 1, wherein the handtruck has a handle with a lift bar UP/DOWN user control.

9. The material transport system of claim 1, wherein the pallet only includes a set of front wheels and no rear wheels.

10. The material transport system of claim 1, wherein the drive wheel is disposed at the front end of the pallet so that it is positioned above the ground surface when the lift bar on the handtruck is in the lower position.

11. A method of using the material transport system of claim 10 to unload the material, comprising:

transporting the material on the pallet with the handtruck lift bar in the lower position and the pallet in a horizontal orientation;

raising the lift bar of the handtruck to the upper position to lift the rear end of the pallet above the ground surface and to cause the drive wheel to contact the ground surface; and moving the handtruck rearwardly to cause the belt to move forward to unload the material from the pallet.

12. A material transport system, comprising:

a pallet having front and rear ends, and wherein the rear end of the pallet includes a mechanical coupling;

a handtruck with a set of ground-contacting wheels and a front end with a lift bar adapted for removeable attachment to the mechanical coupling on the rear end of the pallet;

wherein the pallet includes a set of front wheels and a conveyor belt disposed on front and rear rollers; and wherein the lift bar on the handtruck has a lower position wherein the handtruck is used to transport the pallet on a ground surface, and an upper position wherein the rear end of the pallet lifted to unload material from the conveyor belt to a ground surface; and further including a drive wheel retraction mechanism to prevent movement of the conveyor belt regardless of the position of the lift bar.

13. The material transport system of claim 12, wherein the drive wheel retraction mechanism includes a slot in the pallet and a slide block on which the drive wheel is disposed, wherein the slide block moves upwardly into the slot to avoid ground contact by the drive wheel.

14. A material transport system, comprising:

a pallet having front and rear ends, a set of front wheels at the front end, a mechanical coupling at the rear end, front and rear rollers, a conveyor belt disposed on the front and rear rollers, and a drive wheel coupled to the front roller; and a handtruck having a set of ground-contacting wheels, a front end, and a lift bar at the front end, wherein the lift bar is adapted for removeable attachment to the mechanical coupling at the rear end of the pallet;

wherein the lift bar on the handtruck has a lower position and an upper position, wherein when the lift bar on the handtruck is in the lower position the handtruck is used to transport the pallet in a rolling motion on the front wheels of the pallet on a ground surface, wherein in the lower position the pallet is level and the drive wheel of the pallet does not contact the ground surface, and wherein when the lift bar on the handtruck is in the upper position, the rear end of the pallet is lifted to unload material from the conveyor belt to the ground surface, wherein in the upper position the drive wheel of the pallet contacts the ground surface and the conveyor belt disposed on the front and rear rollers moves forward when the drive wheel coupled to the front roller moves rearward, causing the conveyor belt to move and unload the material onto the ground surface when the handtruck and pallet are moved rearwardly.

15. The material transport system of claim 14, wherein the weight of material on the conveyor belt causes the material to be unloaded due to gravity when the lift bar is in the upper position.

16. The material transport system of claim 14, wherein the pallet includes an electrical power source causing the conveyor belt to move through the activation of a user control.

17. The material transport system of claim 14, wherein the lift bar on the handtruck is a powered lift bar driven by a battery in the handtruck.

18. The material transport system of claim 14, wherein the set of ground-contacting wheels of the handtruck are powered by a battery in the handtruck.

* * * * *